United States Patent [19]

Van der Puije

[11] 3,719,895

[45] March 6, 1973

[54] AUTOMATIC GAIN CONTROL CIRCUIT

[75] Inventor: Patrick David Van der Puije, Ottawa, Ontario, Canada

[73] Assignee: Northern Electric Company, Limited, Montreal, Quebec, Canada

[22] Filed: March 11, 1971

[21] Appl. No.: 123,142

[52] U.S. Cl. ....................330/29, 330/136, 330/138, 330/141

[51] Int. Cl. ....................H03j 3/30

[58] Field of Search................330/29, 136, 138, 141; 325/319, 410

[56] References Cited

UNITED STATES PATENTS

| | | | |
|---|---|---|---|
| 3,267,388 | 8/1966 | Finkey et al. | 330/29 X |
| 3,467,910 | 9/1969 | Schmidt | 330/29 |
| 3,415,950 | 12/1968 | Bartz et al. | 330/151 X |
| 2,681,989 | 6/1954 | Cunniff | 330/136 UX |
| 3,397,324 | 8/1968 | Fine et al. | 330/29 X |

*Primary Examiner*—Roy Lake
*Assistant Examiner*—James B. Mullins
*Attorney*—John E. Mowle

[57] ABSTRACT

An automatic gain control circuit is provided with fast attack and slow release by the use of a capacitor of only 0.01 microfarads and a slow discharge path through the base-emitter circuits of Darlington-connected transistors. The capacitor is charged through a peak detector transistor circuit that also sets the d.c. reference (no signal) level for the control voltage. A low-level cut-off control circuit is similarly provided with a fast attack and slow release.

12 Claims, 3 Drawing Figures

AUTOMATIC GAIN CONTROL CIRCUIT

This invention relates to automatic gain control circuits and more particularly to highly compact transistor type automatic gain control circuits for controlling the gain of a transistor amplifier.

In amplifiers for a telephone system utilizing an amplifier associated with the telephone instrument it is desired to provide the amplifier and all its related equipment in as compact a form as possible. The same applies to audio amplifiers for portable tape recorders and the like. In the usual type of telephone system, because there is ordinarily no local audio amplifier, there is no automatic level control system to compensate for the unintended difference in speech levels resulting from the different ways of holding the telephone instrument and the loudness of different voices.

Semiconductor amplifiers are becoming sufficiently inexpensive and reliable to warrant a more general adoption in telephone systems of low level microphones that are capable of producing a greater recognizability of voices than the carbon microphones which, with their high output and simplicity of structure, have heretofore proved to be most economical. The use of a low level microphone inherently requires a local amplifier near it and this circumstance offers the opportunity of introducing automatic gain control economically.

It is usually preferred in speech circuits to have an automatic gain control with a fast attack so that it can prevent the listener from being startled by loud sounds when he had been hearing low tones, in addition to prevent loss of intelligibility from the distortion that always accompanies unduly loud speech. Because most talkers tend to keep a fairly steady sound level when they speak over the telephone, it is also desirable that the release characteristic of the automatic gain control should be much slower than the attack, so that the gain will not jump up between words and phrases and bring up the level of room noise during such relatively short intervals. The slow release feature also prevents distortion of syllable articulation. Of course, if a talker should reduce the level of his voice while using the telephone, such an amplifier would still make the necessary compensation without any very noticeable delay, because such a change in level would not take place in the middle of a word, but would normally occur only with the start of a new phrase.

A similar fast attack and slow release characteristic is also desirable on automatic controls for what is known as "low-level cut-off" or "squelch". In this service, when the input is below the minimum level deemed usable in view of room noise or circuit noise, the amplification is reduced to a minimum level except for a preliminary stage which must be kept in vigor to detect any new signal above the threshold level. This type of control is particularly useful where several microphones feed into a common audio channel.

Whereas a low-level cut-off control practically must be forward-acting (acting on stages subsequent to the point at which the signal is sensed for control purposes), the automatic gain control can advantageously operate on a signal derived from the output of the controlled amplifier, thus being "backward acting".

Automatic gain control circuits with fast attack and slow release characteristics have heretofore utilized a relatively large capacitance, of about 1 microfarad or even more, across which an automatic gain control voltage is developed by rectifying the signal being controlled. It was known to arrange such a capacitance to be charged rapidly by a signal rectifier and to be discharged by resistances much higher than the resistance involved in the charging path. The type of circuit heretofore provided on the foregoing principle, however, is not suitable for the compact types of amplifier desired for telephone systems, particularly when a control circuit is desired with its stages operating with moderate impedances. If the capacitor is big enough to take the necessary time to discharge through the resistance across an automatic gain control circuit, then charging the capacitor quickly in response to a sudden increase in sound level requires more audio power from the amplifier being controlled than it is convenient or economical to provide in a telephone handset, for example.

By a liberal use, in the automatic gain circuit, of transistors, which have in recent years become economic to produce in compact multiple units, even with integration of interconnections, a circuit can be devised, however, to obtain a sufficiently long discharge time from a small condenser, in this case 0.01 microfarad, in a relatively low impedance automatic gain control circuit. This permits the use of a small tantalum film capacitor and of resistors also made by thin films on a circuit substrate.

In the drawings which illustrate embodiments of the invention:

Figure 1:
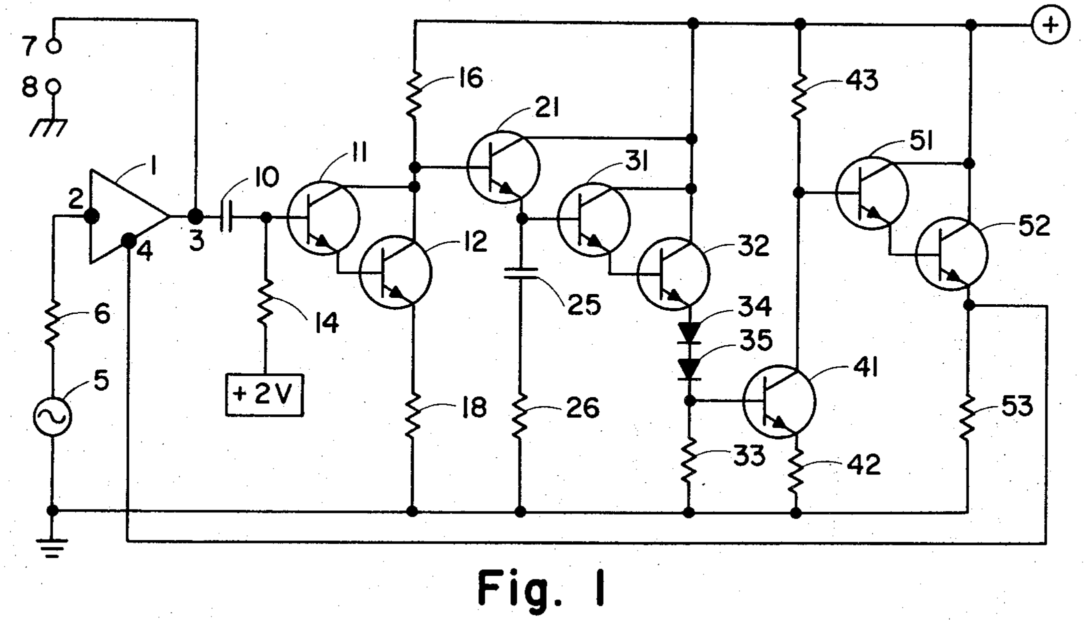
FIG. 1 is a circuit diagram of an automatic gain control circuit according to the invention controlling an amplifier shown in block diagram.

The amplifier 1 of FIG. 1 is a transistor amplifier having an input terminal 2, an output terminal 3 and a gain control terminal 4. The amplifier also has connections to ground and to a positive power supply voltage which are not shown. For gain control it is adapted to accept by terminal 4 a variable positive voltage. Generator symbol 5 and resistance 6 represent the input signal and the circuit over which it is delivered to the input terminal 2 of amplifier 1. The useful output of the amplifier is connected from output terminal 3 to another circuit represented by the terminals 7 and 8, the latter of which shows that the return side of the circuit is connected to ground at the amplifier. Also connected to output terminal 3 of amplifier 1 is a capacitor 10 which couples the amplifier output to the automatic gain control circuit.

The a.g.c. side of capacitor 10 is connected to the base electrode of transistor 11 and also, through resistor 14, to a bias voltage, 2 volts in the illustrated example. Usually the amplifier 1 will have a suitable voltage divider from which this bias voltage can be obtained. This bias voltage must be steady since it sets the no-signal level of the output of the automatic gain control circuit, which is all d.c. coupled. Any drift or transient disturbances of this bias would be superimposed in amplified form on the control voltage.

Transistors 11 and 12 are connected as a Darlington pair and together function as a single transistor of greater capability than either one of the pair. The pair could of course be replaced by a single transistor, particularly if a high current gain transistor should be used. The same holds for other Darlington-connected transistor pairs shown in the drawings, except that in the case of transistors 31 and 32, as explained below, the current multiplication relation between the base and emitter circuits of the combination is so important that it is difficult to get equivalent performance conveniently from a single transistor. However, as mentioned below, the present circuit does not require that the collectors of transistors 31 and 32 be connected together, and transistor 32 may have a resistance between its collector and positive battery in order to produce an inverted output.

Transistor 12 has a load resistor 16 between its collector and the positive supply voltage (which is preferably of the order of 7 to 8 volts) and has a smaller resistor 18 between its emitter and ground. The latter cooperates with the bias supplied through resistor 14 in setting the proper d.c. voltage and current levels for the operation of transistor 12. The amplifying stage utilizing transistors 11 and 12 is not strictly necessary in all contexts, because the next stage draws little power and could function with its input connected to capacitor 10 and resistor 12 if the amplifier 1 should be capable of providing a sufficiently high output level.

The amplified signal appearing at the collector of transistor 12 is connected to the base electrode of transistor 21, of which the collector is connected to the positive supply voltage and the emitter is connected to capacitor 25 as well as to the base electrode of transistor 31. The other side of capacitor 25 is connected to ground through a very small resistance 26 of the order of 100 ohms.

In circuit with capacitor 25, transistor 21 operates as a peak detector and charges capacitor 25 to the positive peaks of the audio signal furnished from the collector of transistor 12. Capacitor 25 has a value of 0.01 microfarad. It can be charged so quickly through transistor 21 when a strong signal suddenly appears, that it is desirable to put the small resistance 26 in series with capacitor 25, to prevent drawing so heavy a transient current from the power supply as to affect other circuits using the same supply by the resulting transient voltage dip. The total resistance in the charging circuit of capacitor 25 is so small that resistor 26 could have a value of two or three hundred ohms without bringing the a.g.c. attack time constant above a millisecond.

Transistor 31 forms a Darlington pair with transistor 32. They function together as an emitter follower, both collectors being connected directly to the supply voltage. The emitter follower load is resistor 33, which preferably has a value of 15,000 ohms, although it may have two or three times that magnitude if a longer a.g.c. release time is desired. Diodes 34 and 35 provide temperature compensation for the control circuit and reduce the d.c. level of the control voltage without reducing its range of variation. The latter function is important because the next stage, utilizing transistor 41, which inverts the direction of change ("dynamic inversion") of the control voltage, inherently raises the d.c. level.

When the alternating current signal peaks applied to the base of transistor 21 come short of reaching the voltage of the emitter of transistor 21, capacitor 25 discharges, but the only way it can discharge is through the base current of transistor 31. This is a very small portion of the current through resistor 33, which means that the discharge of capacitor 25 proceeds as if resistor 33 had a value of a large multiple of its actual value, the multiplying factor being the reciprocal of the proportion of the base current of transistor 31 to the emitter current of transistor 32 (which is the product of the current gains of the two transistors of this Darlington pair). Hence capacitor 25 discharges very slowly. The release time-constant for the automatic gain control voltage can easily be made longer than 125 milliseconds, the usual minimum requirement in speech circuits. This is to be compared with the time-constant of less than 1 millisecond which this circuit exhibits on the attack side. Up to 20 milliseconds is considered adequate for the attack time, however.

Transistor 41 need not supply much gain and, accordingly, is associated with resistors 42 and 43 of relatively low values in its emitter and collector circuits, respectively. Its output goes to transistor 51, which together with transistor 52 forms a Darlington pair collectively connected as an emitter follower to to provide a low-impedance output.

The discharge of capacitor 25 will proceed until the peaks of the alternating current signal appearing at the collector of transistor 12 again exceed the voltage at the emitter of transistor 21, so that at these peaks capacitor 25 is recharged up to the peak level. If there is no alternating current then being supplied to transistor 11, capacitor 25 discharges until the d.c. voltage of the base of transistor 21 exceeds the emitter voltage of transistor 21 by the very small base-emitter voltage. Capacitor 25 then charges just enough to keep it at the appropriate no-signal voltage. This type of circuit, where a d.c. level-setting bias causes the capacitor in the control circuit to be charged to some level above its discharged state avoids the difficulty of simpler peak detection circuits in which charging of a capacitor on an increase of signal from a low value cannot begin until a voltage drop inherent in the detector has been overcome.

The function of transistor 41 in FIG. 1 could, in an alternative arrangement of the circuit, be combined with the function of transistor 32 if it should be desired to reduce the number of transistors in the circuit. In this case a resistor, of about 30,000 ohms for instance, would be connected between the collector of transistor 32 and the positive voltage supply. Output would then be taken from the collector of transistor 32, rather than from its emitter, and supplied directly to the base of transistor 51 (eliminating transistor 41 and resistors 42 and 43). The emitter of transistor 32 would in such case be connected directly to resistor 33 and, because of the necessary elimination of diodes 34 and 35, it would be necessary to reduce the positive bias on the base of transistor 11 to a somewhat lower voltage to keep the d.c. level of the control signal from being unduly high.

In FIG. 1 the common return of the control circuits to the negative side of the battery is shown as grounded, but it is to be understood that the common return to the power supply may be to an off-ground reference potential of low internal impedance, if the particular structure of amplifier 1 should so require.

Figure 2:
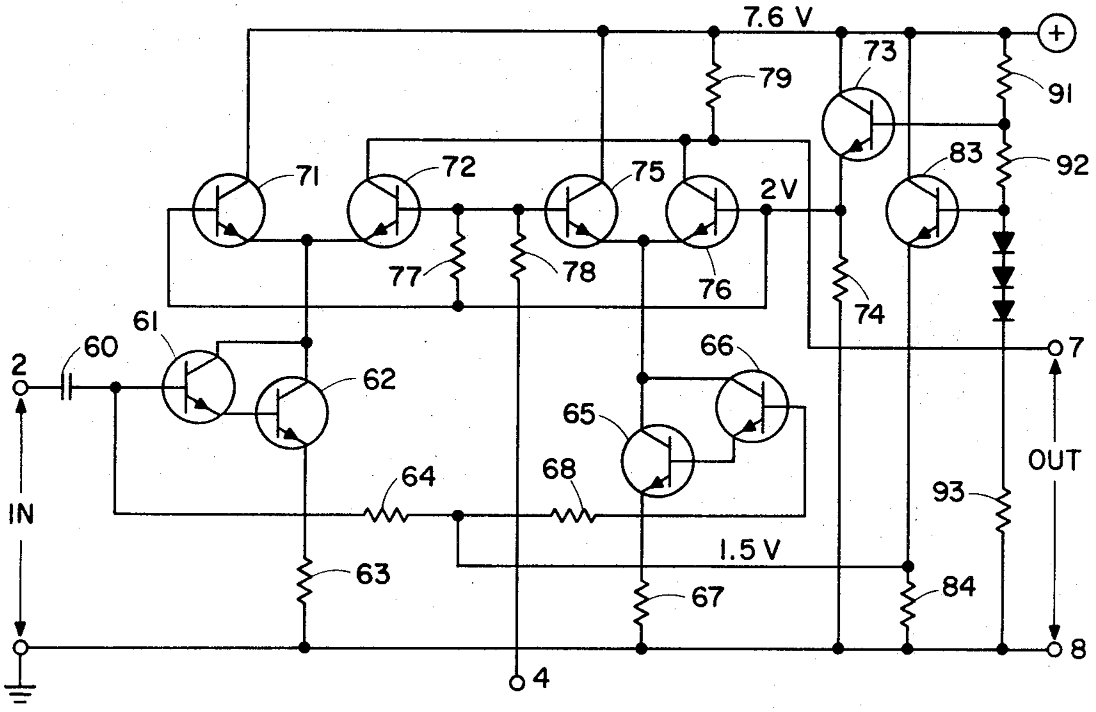
FIG. 2 is a circuit diagram of one form of controlled amplifier stage suitable for use with the specific automatic gain control circuit of FIG. 1.

FIG. 2 shows a preferred form of controlled amplifier stage for use with the embodiment of the invention shown in FIG. 1. The circuit of FIG. 2 provides a wide range of control without any disturbance of the d.c. level of the output by the gain control voltage. This prevents the production of thumps in the output when there is a rapid change in gain control voltage. The circuit was developed for fading television signals in and out electronically and is described in U.S. Pat. No. 3,260,952.

In FIG. 2 transistors 61 and 62, operating as a Darlington pair with an emitter load resistor 63, serve to provide a high input impedance to the input signal circuit. Transistors 61 and 62 function as a "constant current" or high impedance source of signal in the emitter circuits of transistors 71 and 72, which operate in the grounded base mode because the 2 volt bias supplied to the bases of transistors 71 and 72 is furnished by a low impedance bias circuit, constituted by transistor 73 and its emitter load resistor 74. The base of transistor 73 is connected to a suitable voltage divider tap and its emitter follower circuit assures a low impedance character to the bias voltage. That is, the bias voltage is unaffected by variations in the current flowing into or out of the bias source.

The 1.5 volt bias furnished to transistor 61 through its base resistor 64 is likewise from a low impedance voltage source, similarly provided by transistor 83 and resistor 84. Consequently no signal can pass from the circuit of transistor 61 and 62 to that of transistors 65 and 66, which together with their associated resistors 67 and 68 merely provide a d.c. load in the emitter circuits of transistors 75 and 76 having the same characteristics as the circuit between the emitters of transistors 71 and 72 and ground. The only difference is that a signal is provided to transistors 61 and 62, whereas transistors 65 and 66 merely reproduce the d.c. conditions of transistors 61 and 62. Transistors 75 and 76 operate in the grounded base mode in the same fashion as transistors 71 and 72, but as already noted they are not provided with any signal in their emitter circuits. Transistor 71 of the first pair and transistor 76 of the second pair have their bases solidly held at the 2 volt bias voltage, whereas the control voltage supplied through terminal 4 is furnished to the bases of transistors 72 and 75 in a proportion determined by resistors 77 and 78. Transistor 72 is the signal amplifier and load resistor 79 is connected between its collector and the positive supply voltage. The collector of transistor 76 is likewise connected to resistor 79 and it supplies to resistor 79 a compensating direct current, which keeps the direct current through resistor 79 the same, regardless of the control voltage applied through terminal 4, thus preventing changes in control voltage from producing thumps in the signal output. The output which appears at terminal 7 is connected to the collectors of transistors 72 and 76.

Transistor 71 acts as an impedance between the emitter of amplifier transistor 72 and the positive supply voltage, which increases or reduces the signal which transistor 72 amplifies according to whether this impedance is greater or less than that presented by transistor 72. Hence, the variation of the bias of transistor 72 by means of the control voltage applied at terminal 4 can greatly affect the amplitude of the signal which appears at the collector of transistor 72. When the control voltage causes the base of transistor 72 to fall below the 2 volt level at which the base of transistor 71 is maintained, the amplification is low and indeed if the control voltage is low enough, there is actually an attenuation of the signal rather than an amplification. When the base of transistor 72 has a voltage exceeding the 2 volts at which transistor 71 is biased the amplification is moderate to high, becoming higher as the control voltage increases. The control voltage acting on transistor 75 similarly produces in transistor 76 a complementary d.c. effect.

When the circuit of FIG. 2 is operated in connection with the control circuit of FIG. 1 with resistor and capacitor values shown in Table I, low level signals will be amplified about 30 db, unless the input level reaches a few db above—60 dbm (which corresponds to an output-level of −25 dbm) where the control circuit strongly takes holed. The control circuit almost levels off the output near −20 dbm. The point at which the output level is almost levelled off depends upon the bias applied to transistors 11 and 12 (FIG. 1) and the intensity of control (extent of levelling) is governed by the relative values of resistors 77 and 78 (FIG. 2) which also of course affect the d.c. component of the applied control voltage.

TABLE I

| Reference No. | Type of Component | Value |
|---|---|---|
| **10,25,60** | Capacitor | 0.01 μf |
| **14,16,64,68** | Resistor | 56 K ohms |
| **18,42** | " | 4.3 K ohms |
| **26** | " | 100 ohms |
| **33,53** | " | 15 K ohms |
| **43** | " | 11 K ohms |
| **63,67** | " | 5.1 K ohms |
| **74,92** | " | 1.0 K ohms |
| **77** | Resistor | 1.0 K ohms |
| **78** " | | 10 K ohms |
| **79** | " | 47 K ohms |
| **84** | " | 1.5 K ohms |
| **91** | " | 20 K ohms |
| **93** | " | 1.2 K ohms |

Figure 3:
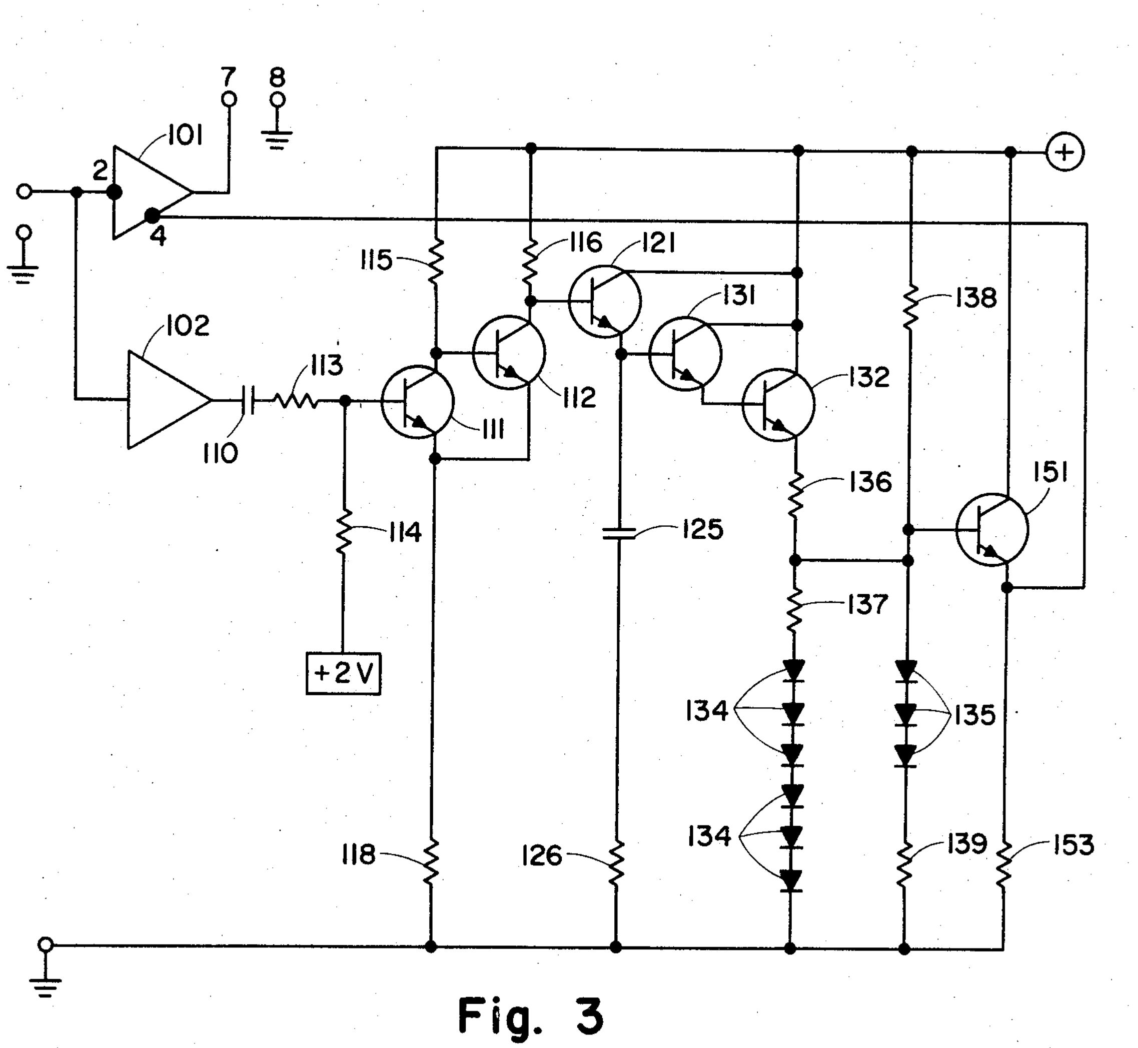
FIG. 3 is a circuit diagram of a modification of the circuit of FIG. 1 for service as a low-level cut-off control.

FIG. 3 shows a modification of the control circuit of FIG. 1 for use in a low-level cut-off circuit. The amplifier 101 can be of the form of FIG. 2, but if a speech channel is to be provided with both automatic gain control and low-level cut-off, it is desirable to use two amplifiers of the type of FIG. 2 in cascade. It is convenient to put the FIG. 1–FIG. 2 combination ahead of the low-level cut-off circuit to avoid excess overloading of some of the low-level cut-off circuits.

As previously explained, a control circuit for low-level cut-off must operate from the input of the controlled amplifier. Even though, as just mentioned, the controlled amplifier 101 is preceded by another amplifier of the form of FIG. 2 to which automatic gain control is applied, nevertheless, at the low levels at which the control circuit of FIG. 3 must operate additional amplification must be provided to the control circuit. This is done by amplifier 102. Since amplifier 102 does not provide any audio signal that gets into the output of amplifier 101, it makes no difference if amplifier 102 overloads by providing clipping or other distortion of the signal at moderate or high levels, because it is only important that it operate effectively as an amplifier at low levels. The preceding gain-controlled stage reduces this overloading on the strongest signals, to manageable levels.

Amplifier 102 is coupled to the control circuit by capacitor 110 and protective resistor 113, furnishing an amplified signal to the circuit composed of transistors 111 and 112 which, in association with resistors 115, 116, and 118 function in a Schmitt trigger (bistable) circuit. Bias for this circuit is provided from the 2 volt bias supply in amplifier 101 (see FIG. 2) through resistor 114. This bias holds steady the d.c. level of the control circuit. The same low-impedance bias supply may serve amplifier 101 and the preceding automatic gain controlled amplifier.

The amount of amplification provided by amplifier 102 is such that when the audio frequency input changes from a level below the desired threshold level to the threshold level or slightly higher, the Schmitt trigger will switch its condition and very quickly bring the collector of transistor 112, which is now switched off, to the power supply level or very nearly there. This charges capacitor 125 through peak detector transistor 121 and resistor 126 in exactly the same way as capacitor 25 was charged in FIG. 1 upon an increase in the base voltage of transistor 21. The Darlington pair of transistors 131 and 132, in their emitter follower operation, will produce an output at the emitter of transistor 132 which will follow the voltage to which capacitor 125 was charged. A suitable portion of that voltage, subject to temperature compensation by diodes 133, 134 and 135, will be supplied to emitter follower 151 which will furnish, at low impedance, a control voltage to terminal 4 that will quickly (in less than a millisecond) increase the gain of amplifier 101 by a desired amount, for example 10 db, when the Schmitt trigger circuit switches condition as just described.

Capacitor 125 can discharge only through transistors 131 and 132 and the emitter circuit of transistor 132. So long as the signal level at the input of amplifier 101 and amplifier 102 remains the above predetermined threshold level, however, transistor 112 will remain in its off condition and capacitor 125 will be kept charged to a voltage close to the power supply voltage through transistor 121. When the signal falls below threshold, however, the Schmitt trigger circuit will quickly switch back (i.e., transistor 112 will conduct), because only the small inherent capacitances of the transistors are involved, and capacitor 125 will discharge slowly through the paths previously described, until it is held at a much lower voltage by the new value of the voltage applied to the base of transistor 121. The circuit is preferably designed to make this process take a little longer than the corresponding discharge time for condenser 25 of FIG. 1, as is reflected in the values given in Table II for resistors 136 and 137, the sum of which considerably exceeds the magnitude given in Table I for resistor 33. When capacitor 125 has reached its new lower level of charge, the control voltage furnished by the emitter of transistor 121 to terminal 4 of amplifier 101 will have reduced the gain of amplifier 101 by the amount designed into the circuit, say 10 db. Under the low level signal conditions then holding, that gain reduction will simply suppress undesired noise. This feature is particularly desirable in two-way talking circuits, where one party is silent while the other speaks, or in multiple microphone pickup arrangements, where during part of the time one or more microphones do not pick up a useful signal and would contribute noise to the output if not cut off.

Illustrative values of components of a low-level cutoff circuit according to FIG. 3, designed to control an amplifier of the specific type described by reference in FIG. 2 and Table I, are given in Table II.

TABLE II

| Reference No. | Type of Component | Value |
|---|---|---|
| **110,125** | Capacitor | 0.01 $\mu$f |
| **113,114** | Resistor | 75 K ohms |
| **115** | " | 51 K ohms |
| **116** | " | 82 K ohms |
| **118,137,139** | " | 10 K ohms |
| **126** | " | 100 K ohms |
| **138** | " | 100 K ohms |
| **153** | " | 15 K ohms |

It may be noted that diodes 135 and resistor 139 form a circuit path parallel with that formed by diodes 134 and resistor 137. This arrangement is equivalent to a single path with a resistor of lower resistance and some diodes of different characteristics. The two-branch circuit path was chosen to fit the temperature characteristics of available diode types to the temperature characteristics of the transistors used in the particular case.

The provision of the relatively large resistor 136 between the emitter of transistor 132 and the portion of its emitter load which is in the base-emitter circuit of transistor 151 reduces the control voltage but results in a relative enhancement of the temperature compensation effects of diodes 134 and 135. The high resistance 138 connecting to the positive voltage supply provides a kind of current bias that reduces the control swing, raises its average level slightly and slightly increases the average current through the diodes 134 and 135. Since the bistable Schmitt trigger circuit gives the control voltage only two steady states, the temperature compensation problem is reduced to compensation for only two different current levels in all of the semiconductor elements of FIG. 3, which makes some rather close compensation feasible, more so than in the case of the automatic gain control circuit of FIG. 1 which provides a gradual wide-range control.

The circuits shown in the drawings utilize npn transistors and a positive collector voltage and the emitter of the output transistor has a positive voltage to ground. Such transistors are preferred for integrated circuits. It will be understood that with pnp transistors and a negative supply voltage connected to the collector circuits, a corresponding negative control voltage output can be obtained. In any case, however, whether the absolute magnitude of the control voltage as measured between the emitter of the output transistor and ground increases or decreases with increasing alternating current input signal depends upon the relative polarity of the peak detector and the number of inverting stages, if any, between the detector output and the control circuit output. For example, the inverting stage provided by transistor 41 in FIG. 1 is not needed in FIG. 3 because the low-signal cut-off control voltage turns down the gain for the lowest-level inputs whereas the automatic gain control turns up the gain for the lower-level inputs.

What is claimed is:

1. A gain control circuit for controlling the gain of a semiconductor variable gain amplifier having a gain control terminal, said gain control circuit comprising:

a. a peak detector comprising a first transistor having its base connected to receive a signal from said variable-gain amplifier superimposed on a bias voltage appropriate for setting the no-signal gain control voltage and also a capacitor and a low resistance connected in series between the emitter of said transistor and a reference potential;

b. a source of direct current potential connected to the collector of said transistor;

c. a discharge circuit for said capacitor comprising a second transistor and a third transistor, said second transistor having its base connected to the emitter of said first transistor, its emitter connected to the base of said third transistor and its collector connected to said source of direct current potential, said third transistor having its emitter connected through a resistor of moderately high resistance to the reference potential and means connecting its collector to said source of direct current potential and, d. means, responsive to a gain control signal at the third transistor, for supplying a gain control voltage to the gain control terminal of said variable gain amplifier.

2. A gain control circuit as defined in claim 1 in which the electrical magnitudes of said capacitor, said low resistance, and said moderately high resistance and the current gain of said second and third transistors is such as to provide a time constant not greater than 20 milliseconds for the charging of said capacitor and a time constant of not less than 125 milliseconds for the discharging of said capacitor.

3. A gain control circuit as defined in claim 1 in which:

e. the collector of said third transistor is connected directly to said source of direct current potential;

f. an inverting semiconductor amplifier is connected to amplify and dynamically invert the voltage across said resistor of moderately high resistance and g. an emitter follower stage is connected to the output of said inverting amplifier and connected to supply a control voltage at lower impedance than said output of said inverting amplifier to said variable gain amplifier.

4. A circuit as defined in claim 3 in which said low resistance does not exceed 300 ohms and in which said moderately high resistance does not exceed 45,000 ohms.

5. A circuit as defined in claim 3 in which at least one diode is connected in series in its conducting direction between said emitter of said third transistor and said resistor of moderately high resistance.

6. A circuit as defined in claim 3 in which:

h. all the transistors are npn transistors;

i. said source of direct current potential is positive with respect to the reference potential, and j. said bias voltage is likewise positive with respect to the reference potential.

7. A gain control circuit as defined in claim 3 in which a semiconductor amplifier is interposed between an output of said variable gain amplifier and the base of said first transistor, in which the base of said first transistor receives a signal from said variable gain amplifier through a direct connection between the base of said first transistor and an output electrode of said interposed semiconductor amplifier and in which the said bias voltage on which said signal is superimposed is determined by a bias supplied on the input of said interposed semiconductor amplifier.

8. A low level cut off gain control circuit for controlling the gain of a variable-gain semiconductor amplifier having a gain control terminal, said gain control circuit comprising:

a. a semiconductor trigger circuit comprising a pair of transistors with a common emitter resistor and separate collector resistors adapted to hold the output transistor of said pair substantially nonconducting when alternating current signals derived from an input of said variable-gain amplifier which exceed a predetermined threshold level are applied to the base of the input transistor of said pair;

b. a source of direct-current potential connected to said collector resistors;

c. bias means associated with the input transistor of said pair in said trigger circuit to set the d.c. output level of said trigger circuit when the absence or low level of input alternating current signals allows the output transistor of said pair to conduct;

d. a peak detector comprising a transistor having its base directly connected to the collector of said output transistor of said trigger circuit and having its collector connected to said source of direct current potential and also a capacitor and a low resistance in series connection between the emitter of said last-mentioned transistor and a reference potential;

e. a discharge circuit for said capacitor comprising a Darlington-connected pair of transistors having the base of the input transistor thereof connected to said capacitor and to the emitter of said transistor of said peak detector, having the emitter of the output transistor of said Darlington-connected pair connected to an emitter load including at least one resistor and having the collectors of said pair of transistors both connected to said source of direct current potential; and f. means, responsive to a gain control signal appearing in the emitter circuit of the output transistor of said Darlington-connected pair, for supplying a gain control voltage to the gain control terminal of said variable gain amplifier.

9. A circuit as defined in claim 8 in which the electrical magnitude of said capacitor, said low resistance and said moderately high resistance and the current gain of said Darlington-connected pair of transistors is such as to provide a time constant not greater than 20 milliseconds for the charging of said capacitor and a time constant not less than 125 milliseconds for the discharging of said capacitor.

10. A circuit as defined in claim 9 in which said emitter load includes, in series, two resistors and a plurality of temperature effect compensating diodes poled in the conducting direction and in which an output is taken from the point of connection of said two resistors to each other, whereby the range of variation of the control voltage developed in the circuit is reduced but the relative effect of said diodes is enhanced, and in which, further, said output is supplied to the base of an emitter follower so connected as to supply from its emitter a similar output voltage at lower impedance to a gain control connection of said first-mentioned semiconductor amplifier.

11. A circuit as defined in claim 10 in which said point of connection of said two resistors is additionally connected to a high resistance the other end of which is connected to said source of direct current potential.

12. A circuit as defined in claim 8 in which all the transistors are npn transistors, said source of direct current potential is positive with respect to the reference potential, and the bias provided to said trigger circuit is a small positive voltage with respect to reference potential.

* * * * *